Figure 1:
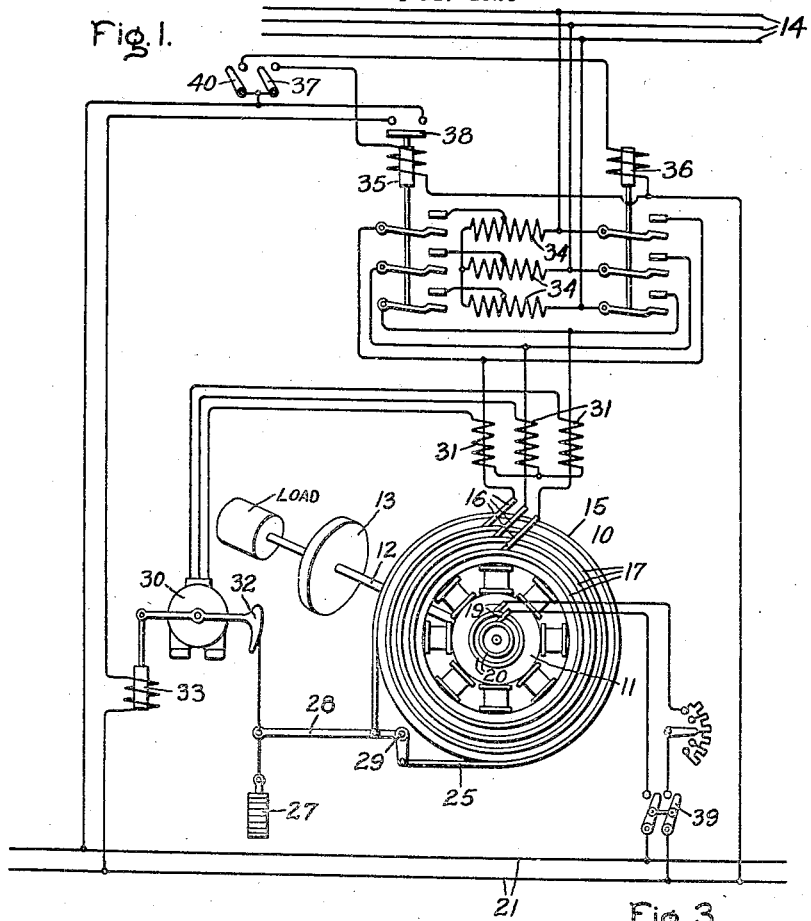

May 8, 1928.  1,669,150

L. A. UMANSKY

SPEED REGULATION OF SYNCHRONOUS MOTORS

Filed May 11, 1926

Inventor:
Leonid A. Umansky,
by
His Attorney.

Patented May 8, 1928.

1,669,150

UNITED STATES PATENT OFFICE.

LEONID A. UMANSKY, OF SCHENECTADY, NEW YORK, ASSIGNOR TO GENERAL ELECTRIC COMPANY, A CORPORATION OF NEW YORK.

SPEED REGULATION OF SYNCHRONOUS MOTORS.

Application filed May 11, 1926. Serial No. 108,390.

In one of its aspects, my invention relates to improvements whereby synchronous alternating current motors may be regulated as to their speed characteristics so as to have in addition to the customary advantages of synchronous motors, the advantageous characteristics of the asynchronous type of alternating current motors.

Because of the power factor corrective characteristics of synchronous motors, this type of motor is being used extensively in places where heretofore the asynchronous type of motor, such as the customary induction motor, would ordinarily have been used. However, the ordinary type of synchronous motor has certain definite limitations which preclude it from use in driving loads having considerable inertia. That is because of the difficulties attendant in starting the synchronous motor with the inertia load and getting the synchronous motor locked in its synchronous relation and because of the fact that after the synchronous motor is locked in its synchronous running relation, the motor will maintain its synchronous speed until the breakdown point of the motor has been reached. In this respect the ordinary synchronous motor is less desirable than the customary induction motor with squirrel cage rotor or wound rotor with regulating resistance included therein, since the inherent characteristics of the induction motor are such that with an increase of load, the speed of the motor will decrease and the speed reduction will enable the rotating parts, possessing a large inertia, to give up part of the energy stored therein and to protect the motor from excessive loads. Among the objects of the present invention is to take advantage of the desirable power factor characteristics of the synchronous motor and at the same time substantially duplicate the desirable speed regulation characteristics of the ordinary type of induction motor.

In carrying my invention into effect in one form thereof, the synchronous motor is provided with a rotatable armature member as well as a rotatable field member, one of the members being arranged to be connected to a load for driving the same. Means are provided whereby a braking effect is applied to the other rotatable member of the synchronous motor. The motor is connected to the alternating current supply circuit with the first member of the motor connected directly to the load and the second member of the motor is permitted to rotate. This second member of the motor will then run in a direction counter to the intended direction of rotation of the first member of the motor, and if the load to which the first member of the motor is connected is heavy or has an appreciable inertia effect, this first member of the motor will remain practically stationary and the second member of the motor will accelerate until practically a synchronous speed relation is had with respect to the first member of the motor. When this synchronous speed relation is practically had, the direct current field winding of the motor is energized and the first and second members of the motor are locked in synchronous running relation. In order to accelerate the first member of the motor and the load connected thereto, the braking effect on the second member of the motor is gradually applied. A synchronous relation will be preserved between the first and second members of the motor and the load will thus be accelerated to the synchronous speed of the motor when the braking effect has been thus gradually increased until the second member of the motor is held stationary. The undesirable starting characteristics of the ordinary type of synchronous motor are thus overcome. In order to obtain the desirable speed regulation characteristics of the ordinary type of induction motor, I provide means for automatically regulating the braking effect applied to the second member of the motor in response to some motor operating condition or in response to the value of the load. This braking effect is preferably regulated in accordance with the current taken by the motor. Thus, when the load on the synchronous motor increases materially, the braking effect on the second member of the motor is correspondingly released so that this second member of the motor will be permitted to rotate at a speed bearing a relation to the load on the motor. By reason of the inherent characteristics of motors of this type, the synchronous relation between the first and second members of the motor will be maintained and the speed of the first member of the motor will be reduced. This characteristic is particularly advantageous when the motor is connected with a flywheel provided for the purpose of equalizing the load on the synchronous motor. Flywheels are ordinarily not connected with synchronous motors, because the minor advantages secured by reason of the flywheel do not compensate for the added expense, and for the disadvantages incurred during starting. However, with my arrangement the kinetic energy stored in the flywheel may be utilized to assist in carrying peak loads the same as in asynchronous motor drives.

In another of its aspects my invention relates to the equalization of the load on a power system by regulating the speed of one member of the motor to utilize the kinetic energy of the other member and the parts connected to rotate therewith.

Figures 2, 3:
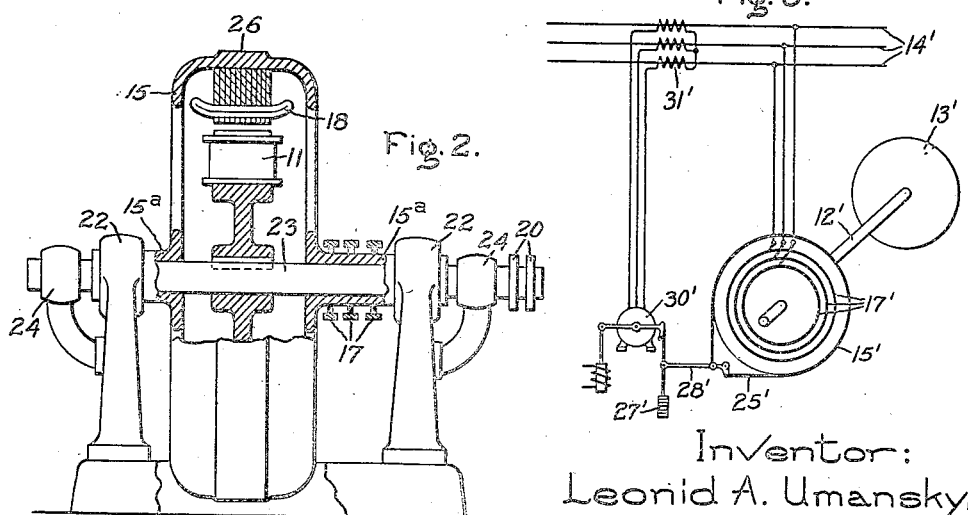

For a better understanding of the invention, reference is had to the accompanying drawing, in which Fig. 1 represents a system of control for a synchronous motor in accordance with the invention, Fig. 2 is a perspective view, partly in section, showing a synchronous motor having a rotatable field and a rotatable armature member in accordance with the invention and Fig. 3 is a simplified diagram of a system in accordance with the invention wherein the kinetic energy of the rotatable field member and the fly wheel connected thereto is utilized to regulate the load on a power system.

Referring to Fig. 1, the synchronous alternating current motor 10 is provided with a rotatable field member 11 which has a plurality of salient poles as is customary in this type of motor. This field member is mounted on a shaft 12 which is arranged to be connected to the load which is merely indicated on the diagram. The flywheel 13 is mounted so as to be driven by the shaft 12, and as will be explained fully hereinafter, this flywheel is capable of regulating the amount of power taken by the synchronous motor from the alternating current supply circuit 14. The synchronous motor 10 is provided with a rotatable armature 15 and it is to be noted that in Fig. 1 I have merely indicated diagrammatically the intended construction of the synchronous motor. The brushes 16 make electrical contact with slip rings 17 which are connected to the armature windings 18 of the motor (Fig. 2). The brushes 19 cooperate with slip rings 20 in supplying current from the direct current source of supply 21 to the rotatable field member 11 of the motor.

By reference to Fig. 2, it will be seen that the armature member 15 is provided with a quill shaft 15ª which is suitably supported in the end bearings 22. The field member 11 is secured to the shaft 23 which passes through the quill shaft 15ª and is supported in the end bearings 24. With this construction, the armature member 15 is capable of rotation and the field member 11 is also capable of rotation.

In order to start the motor and to regulate the speed thereof, I have provided means for retarding the armature member 15. In the arrangement shown in the drawings, this retarding means takes the form of a band brake 25 which cooperates with the surface 26 (Fig. 2) on the outer periphery of the armature member 15. This band brake is normally applied in any suitable manner, as for instance by means of the weights 27 which cooperate with the end of the bell crank lever 28 which is pivoted at 29. The electric torque motor 30 is provided for regulating the application of the brake in accordance with the load on the synchronous motor. In the preferred form of my invention, this torque motor is of the alternating current induction type having a rotor with a high resistance provided internally or externally. The stator windings of this motor are supplied with current from the current transformers 31 which have their primaries included in the armature circuit of the synchronous motor 10. The rotor of the torque motor 30 is connected to the lever 32, one end of which is connected to the same end of the bell crank lever 28 as is the weight 27. The electromagnet 33 has its magnetic movable member connected with the opposite end of the lever 32 and the arrangement is such that when the electromagnet 33 is energized, the lever 32 will be tilted in the counter-clockwise direction, the weight 27 lifted and the left-hand end of the bell crank lever 28 raised so as to completely release the brake band 25 from engagement with the armature 15. Under certain circumstances it may be necessary to provide an arrangement for gradually increasing the potential applied to the armature of the synchronous motor at starting, and I have, therefore, indicated the customary auto-transformer starting arrangement. This arrangement comprises the auto-transformer 34 which is connected to the alternating current source of supply 14. The starting contactor 35 connects the armature of the synchronous motor 10 to the source of supply 14 through the reduced voltage taps of the starting compensator 34, and the running contactor 36 is arranged to connect the armature of the synchronous motor directly to the source of supply 14 for running relation of the synchronous motor.

As thus constructed and arranged and with the parts in their respective positions as indicated in Fig. 1 of the drawing, the operation of my invention is as follows: In order to start the synchronous motor 10 as an asynchronous motor, the master switch 37 is closed to close the starting contactor 35 and thus connect the motor to the source of supply 14 through the taps of the auto-transformer 34. The electromagnet 33 will be energized from the source of supply 21 through the closing of the auxiliary switch 38 of the starting contactor 35. This electromagnet will attract its plunger and thus move the lever 32 in a counterclockwise direction, lifting the weight 27 and releasing the band brake 25 from the armature member of the motor. This member will rotate in a direction counter to the intended direction of operation of the field member 11 which is connected to drive the load. When the rotating armature has accelerated to somewhere near the synchronous speed, the field switch 39 will be closed and this will connect the windings of the salient poles to the direct current excitation supply 21 and cause the field and armature members of the motor to pull into synchronous running relation. The master switch 37 will now be opened and the master switch 40 will be closed, thereby effecting the opening of the starting contactor 35, the deenergization of the solenoid 33 and the closing of the running contactor 36. The full potential of the alternating current supply circuit 14 will be applied to the armature of the motor and the torque motor 30 will be brought into action to regulate the braking effect applied to the rotating armature.

The brake 25 will be applied by the action of the weight 27 and will be released by the operation of the torque motor 30 which responds in accordance with the load on the synchronous motor. The rotating field member of the motor will thus be caused to accelerate while the speed of the rotating armature is being decreased. The load will thus be accelerated to the full running speed of the motor. In case the load on the motor increases to a predetermined value, the torque motor 30 will be energized to such an extent that it will effect a release of the braking effect on the armature 15 so that the armature will be permitted to rotate at a speed which, among other functions, is a function of the load on the motor, the duration of the load and the inertia effect of the fly wheel. The rotating field member of the motor will endeavor to decrease in speed in accordance with the increase in the speed of the rotating armature. The flywheel 13 will thus be permitted to give up a part of its kinetic energy and assist the motor in carrying the peak load imposed thereon. As soon as the peak load has passed, the torque motor 30 will release its lifting effect on the weight 27 and the brake 25 will be applied to the rotating armature. In case the load on the motor has decreased to the normal value, the brake will be fully applied and the rotatable armature will be brought to rest. This will cause the rotating field member to increase in speed to the synchronous value.

It will be understood from the above that in accordance with my invention the synchronous motor is started in a convenient and easy manner and the kinetic energy of the flywheel is made effective to smooth out the peak in the load on the motor, thus giving the same desirable characteristics as the asynchronous type of motor has in this regard and furthermore, the desirable power factor characteristics of the synchronous motor.

In the form of the invention shown in Fig. 3, similar parts and parts having functions which correspond to similar parts in the form of the invention shown in Figs. 1 and 2 are numbered respectively with primes added thereto. This arrangement makes it possible to utilize the kinetic energy of the fly wheel 13' and the rotating parts including the rotating field member of the synchronous motor 15' in equalizing the load on the power lines 14'. Thus, when the load on the lines 14' is in excess of a certain value, the torque motor 30' will release the brake band 25' and permit the armature member to rotate and the kinetic energy of the fly wheel 13' and the rotating field will cause the synchronous motor to act as a generator to assist temporarily in carrying the peak load on the lines 14'.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States is:

1. In combination, an alternating current motor having rotatable field and armature members, one of said members being arranged for connection to a load for driving the same, and means governed responsively to the load on said motor for regulating the speed of the other of said members.

2. In combination, an alternating current motor having rotatable field and armature members, one of said members being arranged for connection to a load for driving the same, and load responsive means for regulating the speeds of said members.

3. In combination, an alternating current motor having rotatable field and armature members, a fly wheel connected to one of said members, and load responsive means for regulating the speed of the other of said members.

4. In combination, a synchronous motor having rotatable field and armature members, a fly wheel connected to one of said members, and means responsive to the current taken by said motor for regulating the speed of the other of said members to utilize the kinetic energy of said fly wheel.

5. In combination, a synchronous motor having rotatable field and armature members, a fly wheel connected to one of said members, a retarding device for the other of said members, and means responsive to the current taken by said motor for regulating the said retarding device to utilize the kinetic energy of said fly wheel.

6. In combination, an alternating current motor having rotatable field and armature members, one of said members being arranged for connection to a load for driving the same, means for retarding the other of said members, and means connected to be energized responsively to the current in the armature circuit of said motor for controlling said retarding means.

7. In combination, an alternating current motor having rotatable field and armature members, the first of said members being arranged for connection with a load for driving the same, a fly wheel connected for rotation with the said first member, normally applied retarding means for the second of said members, and means responsive to the load on said motor for releasing said retarding means to permit said fly wheel to give up part of its kinetic energy and assist in carrying said load.

8. In combination, an alternating current motor having rotatable field and armature members, the first of said members being arranged for connection to a load for driving the same, means for regulating the speed of the second of said members to regulate the torque applied by the first of said members for driving the load, and an electroresponsive device energized in accordance with the current in the armature circuit of said machine for governing said controlling means.

9. In combination, an alternating current motor having rotatable field and armature members, one of said members being arranged for connection to a load for driving the same, normally applied retarding means for the other of said members, an electroresponsive regulating device interconnected with the motor to regulate said retarding means in accordance with a motor operating condition, switch mechanism operative to connect the armature of said motor to an alternating current source of supply for starting and running relations, electroresponsive means controlled by said switch mechanism for rendering said retarding means ineffective upon the establishment of the motor starting relation and thus permit the said other member to rotate when the motor is initially connected to said source, and connections through which said electroresponsive means is rendered ineffective and said regulating device is rendered effective upon the operation of said switch mechanism to interrupt the said starting relation and establish said running relation.

10. In combination, a synchronous motor having rotatable field and armature members, one of said members being arranged for connection to a load for driving the same, a brake for the other of said members, and an electric motor connected to set up a torque proportional to the load on said synchronous motor for regulating the application of said brake to regulate the speed of said other of said members.

11. In combination, a synchronous motor having rotatable field and armature members, a fly wheel driven by one of said members, a brake for the other of said members, an electric motor for regulating the application of said brake, and current responsive means for effecting response of said electric motor to regulate the application of the brake and utilize the kinetic energy of said fly wheel.

In witness whereof, I have hereunto set my hand this 8th day of May, 1926.

LEONID A. UMANSKY.